(12) United States Patent
Bogdanov

(10) Patent No.: US 11,982,177 B2
(45) Date of Patent: May 14, 2024

(54) GAUGE APPARATUS, SYSTEM AND METHOD

(71) Applicant: Expro North Sea Limited, Dyce (GB)

(72) Inventor: Oleg Bogdanov, Christchurch (GB)

(73) Assignee: Expro North Sea Limited, Dyce (GB)

( * ) Notice: Subject to any disclaimer, the term of this patent is extended or adjusted under 35 U.S.C. 154(b) by 190 days.

(21) Appl. No.: 17/439,064

(22) PCT Filed: Mar. 6, 2020

(86) PCT No.: PCT/GB2020/050541
§ 371 (c)(1),
(2) Date: Sep. 14, 2021

(87) PCT Pub. No.: WO2020/183134
PCT Pub. Date: Sep. 17, 2020

(65) Prior Publication Data
US 2022/0155048 A1    May 19, 2022

(30) Foreign Application Priority Data
Mar. 14, 2019 (GB) ...................................... 1903505

(51) Int. Cl.
*E21B 47/08* (2012.01)
*G01B 3/46* (2006.01)
*G01B 5/12* (2006.01)
*G01B 11/12* (2006.01)
*G01B 11/16* (2006.01)

(52) U.S. Cl.
CPC ............... *E21B 47/08* (2013.01); *G01B 3/46* (2013.01); *G01B 5/12* (2013.01); *G01B 11/12* (2013.01); *G01B 11/16* (2013.01)

(58) Field of Classification Search
CPC ......... E21B 47/08; G01B 11/12; G01B 11/16; G01B 5/12; G01B 3/46
See application file for complete search history.

(56) References Cited

U.S. PATENT DOCUMENTS 8,978,782 B2   3/2015  Martinez
2008/0266577 A1*  10/2008  Prouvost ................. E21B 47/08
                                                              385/13

(Continued)

OTHER PUBLICATIONS

Yue et al. "Application of Differential Bragg Grating Displacement Cell in Bridge Crack Monitoring", SPIE, vol. 7278, p. 72780D-1, Mar. 13, 2009.

*Primary Examiner* — Christopher J Sebesta
(74) *Attorney, Agent, or Firm* — Getz Balich LLC

(57) ABSTRACT

A gauge apparatus includes a body member, one or more gauge arms biased outwardly from the body member for engagement with a wall of the elongated space, and one or more deformable regions. The gauge apparatus is configured so that a variation in an outward extension of each gauge arm from the body member induces a change in strain in a corresponding one of the one or more deformable regions. A gauge system includes the gauge apparatus and an optical fiber attached to the gauge apparatus so that a strain in each deformable region of the gauge apparatus is transferred to a corresponding sensor portion of the optical fiber. The gauge system may be used for making real-time measurements of a geometry of an elongated space such as a wellbore of an oil and gas well.

19 Claims, 7 Drawing Sheets

(56) References Cited

U.S. PATENT DOCUMENTS

| | | | | |
|---|---|---|---|---|
| 2010/0108386 A1* | 5/2010 | Martinez | ............... | E21B 47/08 |
| | | | | 175/45 |
| 2013/0192821 A1* | 8/2013 | Stoesz | ................ | E21B 4/04 |
| | | | | 166/250.01 |
| 2015/0136264 A1* | 5/2015 | Holland | ............... | E21B 47/007 |
| | | | | 138/104 |
| 2016/0011066 A1 | 1/2016 | Taverner | | |
| 2016/0040527 A1* | 2/2016 | Balagopal | ............ | G02B 6/4413 |
| | | | | 385/13 |

* cited by examiner

GAUGE APPARATUS, SYSTEM AND METHOD

This application claims priority to PCT Patent Appln. No. PCT/GB2020/050541 filed Mar. 6, 2020, which claims priority GB Patent Appln. No. 1903505.4 filed Mar. 14, 2019, which are herein incorporated by reference.

BACKGROUND OF THE INVENTION

1. Technical Field

The present disclosure relates to a gauge apparatus, system and method for use in making real-time measurements of a geometry of an elongated space and, in particular though not exclusively, for making real-time measurements of a geometry of an elongated space within a wellbore or a borehole of an oil or gas well.

2. Background Information

Feeler gauges are known for use in making measurements of the geometry of a wellbore of an oil or gas well. Such known feeler gauges typically include one or more feeler arms for engaging a wall of the wellbore. Each feeler arm is biased outwardly from a body of the feeler gauge into engagement with the wellbore wall. The feeler gauge is lowered, run or propelled through the wellbore such that the degree of extension of each feeler arm away from the feeler gauge body varies as the feeler arms move over any surface variations or surface roughness or any changes in diameter of the wellbore. In known feeler gauges, the variations in extension of each feeler arm are measured and recorded within the feeler gauge (e.g. in a memory of the feeler gauge) for analysis once the feeler gauge is recovered to surface. As such, known feeler gauges are not capable of providing real-time measurements of the wellbore geometry.

SUMMARY OF THE INVENTION

It should be understood that any one or more of the features of any of the following aspects or embodiments may be combined with any one or more of the features of any of the other aspects or embodiments.

According to at least one aspect or to at least one embodiment of the present disclosure there is provided a gauge apparatus for use in making real-time measurements of a geometry of an elongated space, the gauge apparatus comprising: a body member; one or more gauge arms biased outwardly from the body member for engagement with a wall of the elongated space; and one or more deformable regions, wherein the gauge apparatus is configured so that a variation in an outward extension of each gauge arm from the body member induces a change in strain in a corresponding one of the one or more deformable regions, and wherein the gauge apparatus is configured for attachment of an optical fiber to the gauge apparatus so that a strain in each deformable region of the gauge apparatus is transferred to a corresponding sensor portion of the optical fiber.

Such a gauge apparatus may be of use in making real-time measurements of the geometry of the elongated space. The optical fiber may be configured to withstand temperatures of up to 100° C., up to 200° C., up to 600° C. or up to 1,000° C. The use of such an optical fiber may permit real-time measurements of the geometry of the elongated space to be made where high temperatures exist in the elongated space.

Each deformable region may be elastically deformable.

The body member may define a cavity internally thereof. The cavity may be sealed.

Each deformable region of the gauge apparatus may be located inside the cavity.

The gauge apparatus may comprise a deformable portion which defines the one or more deformable regions.

The deformable portion of the gauge apparatus may comprise a deformable diaphragm, a deformable substrate, and/or a deformable plate.

The deformable portion of the gauge apparatus may be located inside the cavity.

Each gauge arm may be located outside the body member.

The body member may define one or more recesses on an outer surface thereof. Each recess may accommodate at least a part of a corresponding gauge arm. At least a part of each gauge arm may be moveable reciprocally within a corresponding recess.

Each gauge arm may extend through a wall of the body member.

The body member may define a plurality of slots, each slot extending through the wall of the body member. Each gauge arm may extend through a corresponding one of the slots.

Each gauge arm may be articulated.

The gauge apparatus may comprise one or more bias members, wherein each bias member is configured to bias a corresponding one of the gauge arms in an outward direction relative to the body member.

Each bias member may be attached between a corresponding one of the gauge arms and a corresponding deformable region of the gauge apparatus so as to bias the corresponding gauge arm in an outward direction relative to the body member such that a force acting on the corresponding gauge arm in an inward direction relative to the body member acts against the corresponding bias member and the corresponding bias member induces a corresponding change in strain in the corresponding deformable region of the gauge apparatus.

Each bias member may operate in tension.

Each bias member may comprise a pull rod.

Each bias member may operate in compression.

Each bias member may comprise a push rod.

The gauge apparatus may comprise one or more seal members, wherein each seal member forms a seal between the body member and a corresponding one of the bias members.

According to at least one aspect or to at least one embodiment of the present disclosure there is provided a gauge system for use in making real-time measurements of a geometry of an elongated space, the gauge system comprising: the gauge apparatus as described above; and an optical fiber attached to the gauge apparatus so that a strain in each deformable region of the gauge apparatus is transferred to a corresponding sensor portion of the optical fiber.

The optical fiber may be attached to the gauge apparatus using a polymer based adhesive and/or an epoxy.

The optical fiber may be metallized. The optical fiber may be attached to the gauge apparatus using metal-to-metal based bonding and/or by brazing.

Each sensor portion of the optical fiber may comprise an optical grating such as a fiber Bragg grating (FBG).

One or more of the FBGs may comprise a chemical composition FBG.

One or more of the FBGs may comprise a UV laser induced refractive index FBG.

The gauge system may comprise an optical apparatus configured to transmit light along the optical fiber to each sensor portion of the optical fiber and to detect light returning from each sensor portion of the optical fiber.

The gauge system may comprise a controller, wherein the controller is configured to determine a value of a strain in each sensor portion of the optical fiber based at least in part on one or more properties of the detected returning light.

The optical apparatus may be configured to detect a portion of the light input to the optical fiber, and the controller may be configured to determine the value of the strain in each sensor portion of the optical fiber based in part on one or more properties of the detected portion of the light input to the optical fiber.

The controller may be configured to determine, for each gauge arm, a value for the outward extension of the gauge arm from the body member based on the determined strain value in the sensor portion of the optical fiber corresponding to the gauge arm and knowledge of the configuration of the gauge apparatus.

The controller may comprise an optical apparatus controller provided with the optical apparatus and a separate system controller.

The optical apparatus controller and the system controller may be configured for communicate with one another.

The optical apparatus controller may be configured to determine the value of the strain in each sensor portion of the optical fiber based at least in part on one or more properties of the detected returning light.

The system controller may be configured to receive the determined value of the strain in each sensor portion of the optical fiber from the optical apparatus controller and to determine, for each gauge arm, a value for the outward extension of the gauge arm from the body member based on the received strain value corresponding to the gauge arm and knowledge of the configuration of the gauge apparatus.

The optical apparatus may be configured to detect a portion of the light input to the optical fiber, and the optical apparatus controller may be configured to determine the value of the strain in each sensor portion of the optical fiber based in part on one or more properties of the detected portion of the light input to the optical fiber.

The optical fiber may be attached to the gauge apparatus so that a strain in a reference region of the gauge apparatus is transferred to a corresponding reference portion of the optical fiber, wherein the reference region of the gauge apparatus is susceptible to a strain which is dependent on temperature but independent of a degree of outward extension of any of the one or more gauge arms from the body member.

The optical apparatus may be configured to transmit light along the optical fiber to the reference portion of the optical fiber and to detect light returning from the reference portion of the optical fiber.

The controller may be configured to determine a value of a strain in the reference portion of the optical fiber based at least in part on one or more properties of the detected light returning from the reference portion of the optical fiber.

The controller may be configured to correct the determined value of the strain in each sensor portion of the optical fiber for temperature based at least in part on the determined value of the strain in the reference portion of the optical fiber.

The gauge system may comprise a plurality of optical fibers, wherein each optical fiber is attached to the gauge apparatus and wherein a variation in the outward extension of each gauge arm from the body member induces a change in strain in a corresponding sensor portion of one of the optical fibers.

The optical apparatus may be configured to transmit light along each optical fiber to the sensor portion of each optical fiber and to detect light returning from the sensor portion of each optical fiber.

The controller may be configured to determine a value of a strain in the sensor portion of each optical fiber based at least in part on one or more properties of the detected light returning from the sensor portion of each optical fiber.

The optical apparatus may be configured to detect a portion of the light input to each optical fiber and the controller may be configured to determine the value of the strain in the sensor portion of each optical fiber based in part on one or more properties of the detected portion of the light input to each optical fiber.

One or more of the optical fibers may be attached to the gauge apparatus so that a strain in a reference region of the gauge apparatus is transferred to one or more corresponding reference portions of one or more of the optical fibers, wherein the reference region of the gauge apparatus is susceptible to a strain which is dependent on temperature but independent of a degree of outward extension of any of the one or more gauge arms from the body member.

The optical apparatus may be configured to transmit light along one or more of the optical fibers to the one or more corresponding reference portions of the one or more optical fibers and to detect light returning from the one or more corresponding reference portions of the one or more optical fibers.

The controller may be configured to determine a value of a strain in each of the one or more reference portions of the one or more optical fibers based at least in part on one or more properties of the detected light returning from each of the one or more reference portions of the one or more optical fibers.

The controller may be configured to correct the determined value of the strain in each sensor portion of the optical fiber for temperature based at least in part on the one or more determined values of the strain in the one or more reference portions of the one or more optical fibers.

The gauge system may comprise a line for supporting the gauge apparatus, wherein the gauge apparatus is attached to one end of the line.

The line may comprise a slickline, a wireline, a cable, coiled tubing, or the like.

The line may include each optical fiber. Specifically, the line may include the optical fiber or each optical fiber of the plurality of optical fibers.

According to at least one aspect or to at least one embodiment of the present disclosure there is provided a method for use in making real-time measurements of a geometry of an elongated space, the method comprising: passing a gauge apparatus along the elongated space with one or more gauge arms of the gauge apparatus biased outwardly into engagement with a wall of the elongated space so that any variation in a transverse geometry of the elongated space causes a variation in an outward extension of each gauge arm from a body member of the gauge apparatus, wherein the gauge apparatus is configured so that the variation in the outward extension of each gauge arm from the body member induces a change in strain in a corresponding deformable region of the gauge apparatus and wherein an optical fiber is attached to the gauge apparatus so that a strain in each deformable region of the gauge apparatus is transferred to a corresponding sensor portion of the optical fiber.

The method may comprise: transmitting light along the optical fiber to each sensor portion of the optical fiber; detecting light returning from each sensor portion of the optical fiber; and determining a value of a strain in each sensor portion of the optical fiber based at least in part on one or more properties of the detected returning light.

The method may comprise: detecting a portion of the light input to the optical fiber; and determining the value of the strain in each sensor portion of the optical fiber based in part on one or more properties of the detected portion of the light input to the optical fiber.

The method may comprise determining, for each gauge arm, a value for the outward extension of the gauge arm from the body member based on the determined strain value in the sensor portion of the optical fiber corresponding to the gauge arm and knowledge of the configuration of the gauge apparatus.

The method may comprise: transmitting light along the optical fiber to a reference portion of the optical fiber; and detecting light returning from the reference portion of the optical fiber, wherein the optical fiber is attached to the gauge apparatus so that a strain in a reference region of the gauge apparatus is transferred to the reference portion of the optical fiber, and wherein the reference region of the gauge apparatus is susceptible to a strain which is dependent on temperature but independent of a degree of outward extension of any of the one or more gauge arms from the body member.

The method may comprise determining a value of a strain in the reference portion of the optical fiber based at least in part on one or more properties of the detected light returning from the reference portion of the optical fiber.

The method may comprise correcting the determined value of the strain in each sensor portion of the optical fiber for temperature based at least in part on the determined value of the strain in the reference portion of the optical fiber.

The method may comprise, while the gauge apparatus is passed along the elongated space with the one or more gauge arms in engagement with the wall of the elongated space: repeatedly transmitting light along the optical fiber to each sensor portion of the optical fiber; repeatedly detecting light returning from each sensor portion of the optical fiber; and repeatedly determining the value of the strain in each sensor portion of the optical fiber based at least in part on one or more properties of the detected returning light.

The method may comprise, while the gauge apparatus is passed along the elongated space with the one or more gauge arms in engagement with the wall of the elongated space: repeatedly detecting a portion of the light input to the optical fiber; and repeatedly determining the value of the strain in each sensor portion of the optical fiber based in part on one or more properties of the detected portion of the light input to the optical fiber.

The method may comprise, while the gauge apparatus is passed along the elongated space with the one or more gauge arms in engagement with the wall of the elongated space: repeatedly determining, for each gauge arm, a value for the outward extension of the gauge arm from the body member based on the determined strain value corresponding to the gauge arm and knowledge of the configuration of the gauge apparatus.

The elongated space may be defined within a wellbore or a borehole of a well such as an oil or gas well.

The elongated space may be defined within a tubular member such as a casing, a length of tubing, a tubing string, a pipe or a pipeline.

BRIEF DESCRIPTION OF THE DRAWINGS

A gauge apparatus, system and method for use in making real-time measurements of a geometry of an elongated space will now be described by way of non-limiting example only with reference to the following drawings of which.

DETAILED DESCRIPTION OF THE INVENTION

One of ordinary skill in the art will understand that one or more of the features of the embodiments described below with reference to the drawings may produce effects or provide advantages when used in isolation from one or more of the other features of the embodiments, and that different combinations of the features are possible other than the specific combinations of the features in each of the embodiments described below.

Figure 1:
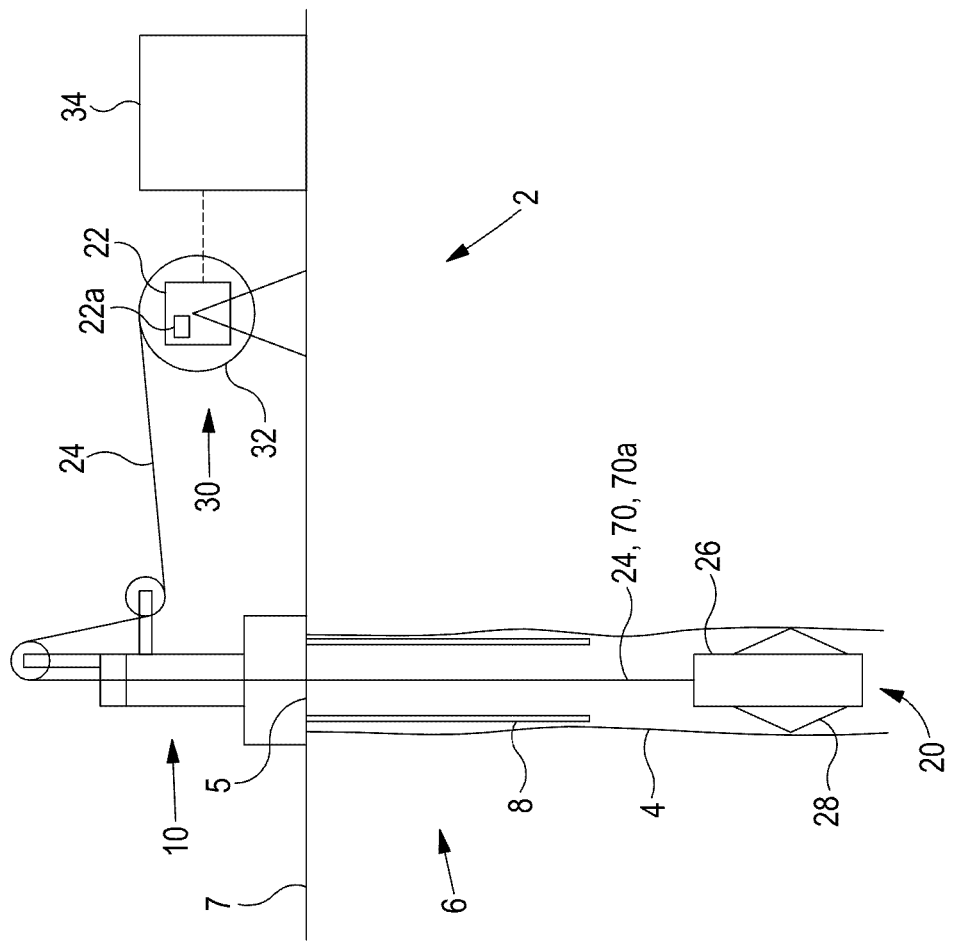
FIG. 1 is a schematic of a gauge system for making real-time measurements of a wellbore of an oil or gas well.

Referring initially to FIG. 1 there is shown a gauge system generally designated 2 for making real-time measurements of a geometry of an elongated space in the form of wellbore 4 of an oil or gas well generally designated 6. The wellbore 4 defines an opening 5 at a surface 7 which may represent a surface of the ground or a surface of the seabed. The oil or gas well 6 includes a casing 8, located within the wellbore 4. The casing 8 is suspended from a wellhead arrangement 10 located above the surface 7.

The gauge system 2 includes a gauge apparatus 20, an optical apparatus in the form of an optical interrogator apparatus 22, and a line 24 which is attached at one end to the gauge apparatus 20 and which is attached at the other end to the optical apparatus 22. The line 24 includes one or more optical fibers 70, 70a which optically couple the optical interrogator apparatus 22 to the gauge apparatus 20. One of ordinary skill in the art will understand that the line 24 may be a slickline, a wireline, a cable, coiled tubing or the like.

As will be described in more detail below, the gauge apparatus 20 includes a body member 26 and a plurality of gauge arms 28 for engaging a wall of the wellbore 4. Each gauge arm 28 extends outwardly from the body member 26 and is biased in an outward direction relative to the body member 26. The gauge apparatus 20 is configured so that a change in the outward extension of each of the gauge arms 28 results in a corresponding change in strain in the one or more optical fibers. The optical interrogator apparatus 22 is configured to transmit light along the one or more optical fibers to the gauge apparatus 20 and to detect light returning from the gauge apparatus 20. One of ordinary skill in the art will understand that the optical interrogator apparatus 22 includes at least one optical source (not shown) and at least one optical detector (not shown) for this purpose. The optical interrogator apparatus 22 includes a controller 22a which is configured to determine one or more strain values in the one or more optical fibers 70, 70a based at least in part on one or more properties of the detected returning light.

The gauge system 2 further includes a winch arrangement generally designated 30. The winch arrangement 30 includes a motorized drum 32 for paying out and/or reeling in the line 24 so as to pass or run the gauge apparatus 20 along the wellbore 4 or so as to permit the gauge apparatus 20 to be passed or run along the wellbore 4. The optical interrogator apparatus 22 is mounted on, and rotates with, the motorized drum 32.

The gauge system 2 further includes a system controller 34 which is configured for communication with the winch arrangement 30. The system controller 34 includes a user interface (not shown) for controlling the motorized drum 32. As represented by the dashed line in FIG. 1, the system controller 34 is also configured for wireless communication with the controller 22a of the optical interrogator apparatus 22. Specifically, the system controller 34 is configured to receive a determined strain value in the one or more optical fibers 70, 70a from the controller 22a of the optical interrogator apparatus 22 and to determine, for each gauge arm 28, a value for the outward extension of the articulated gauge arm 28 from the body member 26 from the received strain value corresponding to the articulated gauge arm 28 and from knowledge of the configuration of the gauge apparatus 20.

Figure 2:
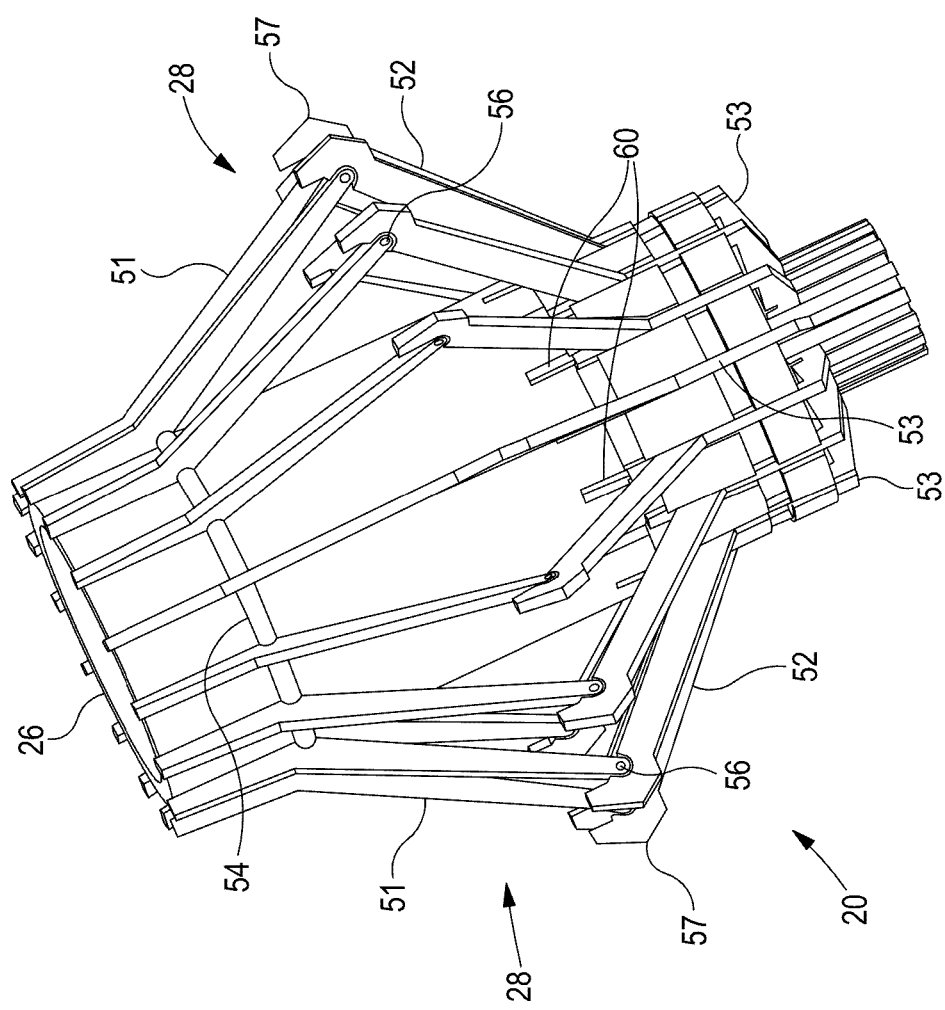
FIG. 2 is a perspective view of a gauge apparatus of the gauge system of FIG. 1.
Figure 3:
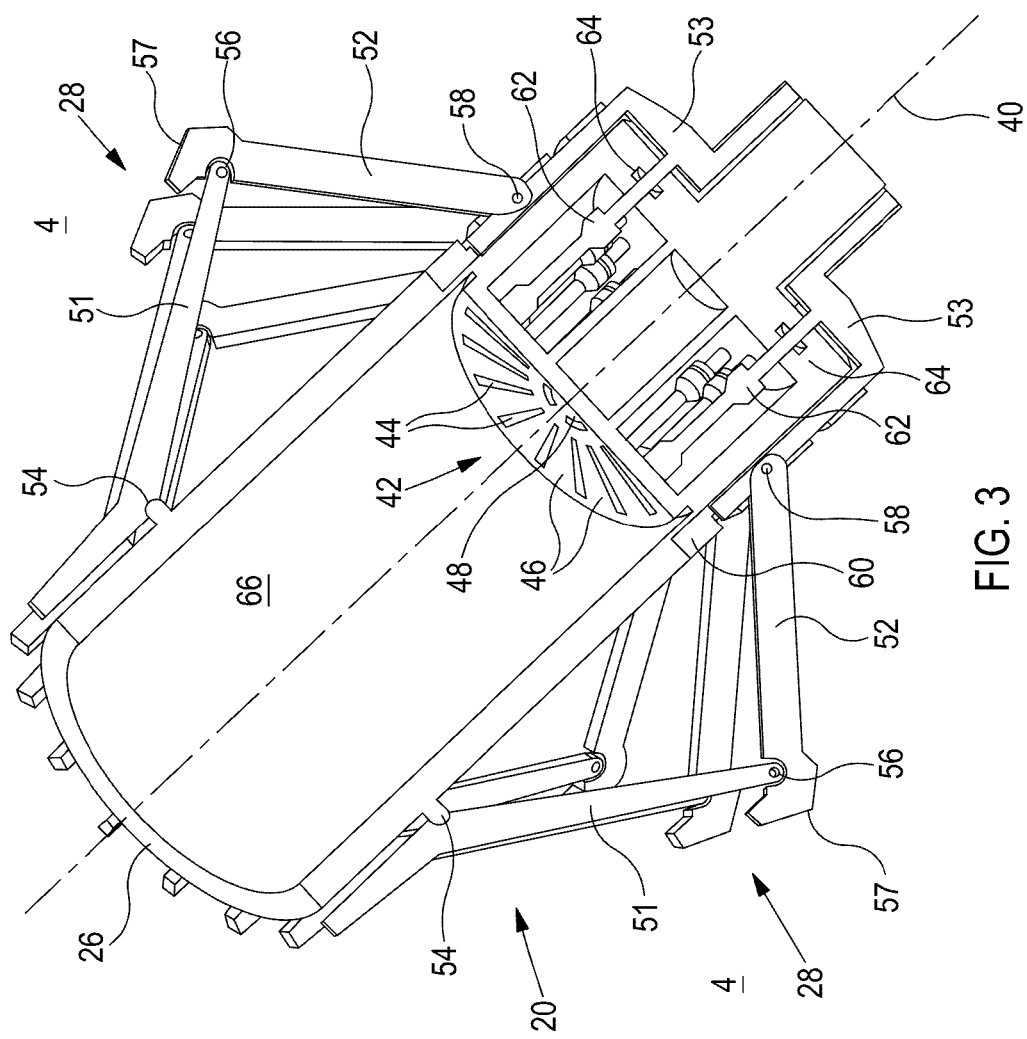
FIG. 3 is a longitudinal cross-section of the gauge apparatus of FIG. 2 before attachment of optical fibers.

FIGS. 2 and 3 show the gauge apparatus 20 in more detail. The body member 26 is generally cylindrical and extends along a longitudinal axis 40 which is, in use, generally aligned with an axis of the wellbore 4. It should be understood that although an upper end the body member 26 is shown as being open in FIGS. 2 and 3, in reality, the upper end of the body member 26 is closed and includes a rope socket or the like (not shown) for mechanical attachment of the body member 26 to the line 24. The gauge apparatus 20 further includes a deformable plate member 42 which extends across an internal diameter of the body member 26. The deformable plate member 42 defines a plurality of radially-extending apertures 44 therethrough. Each pair of adjacent apertures 44 defines a deformable region 46 of the deformable plate member 42 circumferentially therebetween. The deformable plate member 42 also defines a central reference region 48 having no apertures extending therethrough.

Each gauge arm 28 is articulated. Specifically, each gauge arm 28 includes a first arm member 51, a second arm member 52 and a third arm member 53. The first arm member 51 is pivotally attached to the body member 26 at a first pivot in the form of a circumferential protrusion 54 defined on an outer surface of the body member 26. Although not shown in FIG. 2 or 3, it should be understood that the first arm member 51 of each gauge arm 28 is retained or held with respect to the body member 26 by an annular elastomeric member or collar (not shown) which is located above the circumferential protrusion 54. The first and second arm members 51, 52 are pivotally attached to one another at a second pivot 56. Adjacent to the second pivot 56, the second arm member 52 defines a radially outer extremity 57 for engaging a wall of the wellbore 4. As shown most clearly in FIG. 3, the second and third arm members 52, 53 are pivotally attached to one another at a third pivot 58.

The body member 26 defines a plurality of longitudinal recesses 60 on an outer surface thereof. Each recess 60 accommodates a corresponding third arm member 53 and is configured to permit the third arm member 53 to reciprocate up and down in a longitudinal direction parallel to the longitudinal axis 48 within the recess 60 in response to a radially inward force exerted on the extremity 57 of the corresponding gauge arm 28. As shown in FIG. 3, the gauge apparatus 20 further includes a plurality of bias members in the form of a plurality of longitudinally extending pull rods 62. One end of each pull rod 62 is attached to a corresponding third arm member 53 and the other end of each pull rod 62 is attached to a corresponding deformable region 46 of the deformable plate member 42. The pull rods 62 operate in tension so as to bias the gauge arms 28 radially outwardly.

None of the pull rods 62 are attached to the central reference region 48 of the deformable plate member 42. As such, one of ordinary skill in the art will understand that the central reference region 48 of the deformable plate member 42 is susceptible to a strain which is dependent on temperature but which is independent of a degree of outward extension of any of the one or more gauge arms 28 from the body member 26.

The gauge apparatus 20 further includes a plurality of O-ring seal members 64, each O-ring seal member 64 forming a fluid-tight seal between the body member 26 and an outer surface of a corresponding pull rod 62. As already described above, the upper end of the body member 26 is closed. Consequently, the O-ring seal members 64 effectively define a sealed cavity 66 internally of the body member 26.

Figure 4:
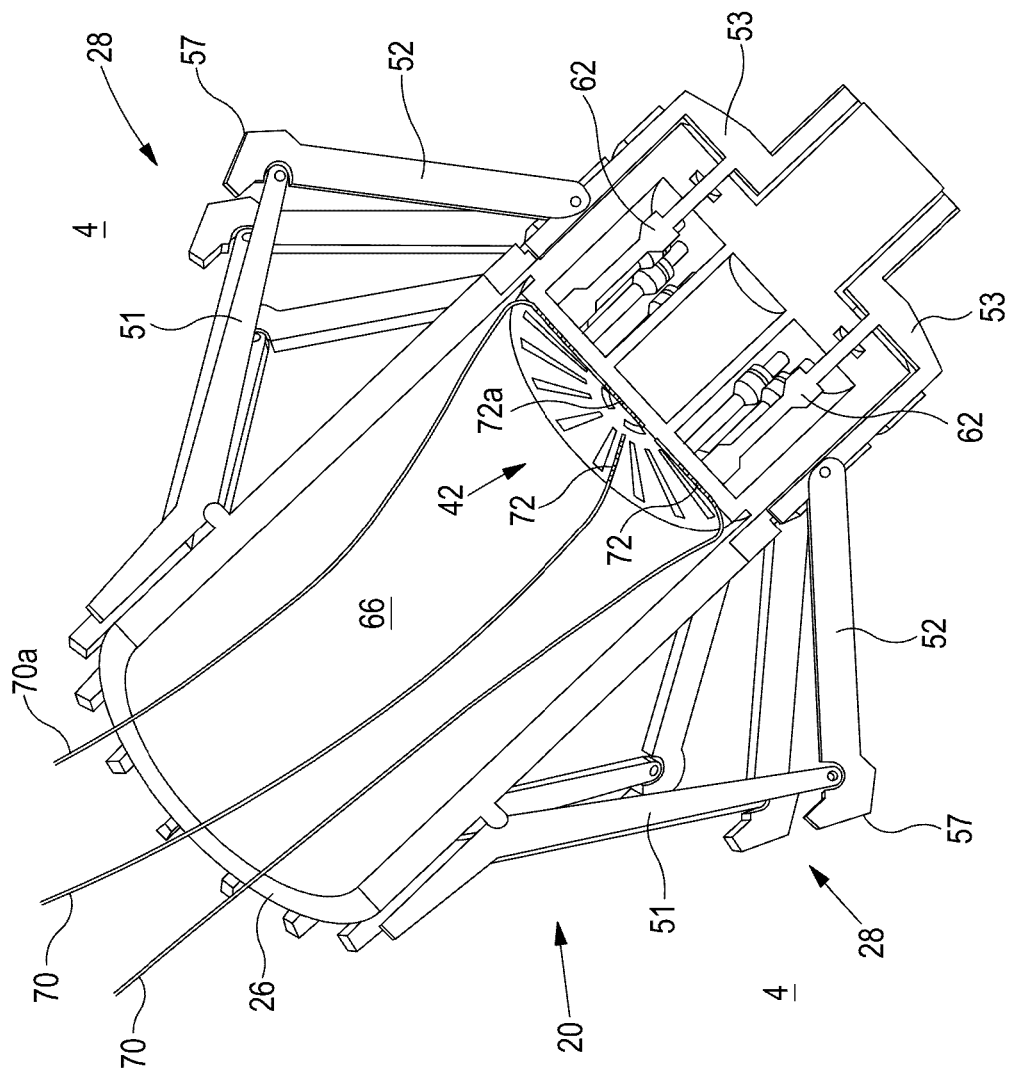
FIG. 4 is a longitudinal cross-section of the gauge apparatus of FIG. 2 after attachment of optical fibers.

FIG. 4 shows the gauge apparatus 20 after attachment of sensor optical fibers 70 and a reference optical fiber 70a to the deformable member 42 within the sealed cavity 66. Although only two sensor optical fibers 70 are shown in FIG. 4 in the interests of clarity, it should be understood that the number of sensor optical fibers 70 may be greater or fewer than two. For example, there may be one sensor optical fiber 70 for each deformable region 46 of the deformable plate member 42. Each sensor optical fiber 70 includes a corresponding fiber Bragg grating (FBG) sensor portion 72. Similarly, the reference optical fiber 70a includes a corresponding fiber Bragg grating (FBG) sensor portion 72a. The FBG sensor portion 72 of each sensor optical fiber 70 is attached to an upper surface of a corresponding deformable region 46 of the deformable plate member 42 so that any strain in the corresponding deformable region 46 is transferred to the FBG sensor portion 72 of the sensor optical fiber 70. Similarly, the FBG sensor portion 72a of the reference optical fiber 70a is attached to an upper surface of the central reference region 48 of the deformable plate member 42 so that any strain in the central reference region 48 of the deformable plate member 42 is transferred to the FBG sensor portion 72a of the reference optical fiber 70a. The sealed cavity 66 protects the optical fibers 70, 70a from the environment of the wellbore 4.

In use, the gauge apparatus 20 is passed along the wellbore 4 with the gauge arms 28 in engagement with the wall of the wellbore 4. As the gauge apparatus 20 passes along the wellbore 4, the optical interrogator apparatus 22 repeatedly transmits light along the optical fiber to the FBG sensor portions 72 of the sensor optical fibers 70 and to the FBG sensor portion 72a of the reference optical fiber 70a and repeatedly detects light returning from the FBG sensor portions 72, 72a of the optical fibers 70, 70a. As the gauge apparatus 20 passes along the wellbore 4, the controller 22a of the optical interrogator apparatus 22 repeatedly determines a value of the strain in the FBG sensor portions 72 of the sensor optical fibers 70 based at least in part on one or more properties of the detected light returning along the sensor optical fibers 70. Similarly, as the gauge apparatus 20 passes along the wellbore 4, the controller 22a of the optical interrogator apparatus 22 repeatedly determines a value of the strain in the FBG sensor portion 72a of the reference optical fiber 70a based at least in part on one or more properties of the detected light returning along the reference optical fiber 70a. Specifically, one of ordinary skill in the art will understand that each FBG sensor portion 72, 72a of the optical fibers 70, 70a may define a corresponding reflectance spectrum having a peak reflectance wavelength which varies according to the strain in the FBG sensor portion 72, 72a and that the optical apparatus controller 22a repeatedly determines the value of the strain in each FBG sensor portion 72, 72a based on the peak reflectance wavelength of the detected light returning from the relevant FBG sensor portion 72, 72a. The controller 22a of the optical interrogator apparatus 22 uses the values of the strain in the FBG sensor portion 72a to correct the values of the strain in each FBG sensor portion 72 for any temperature-induced strain variations.

The system controller 34 repeatedly receives the corrected values of the strain in each FBG sensor portion 72 from the controller 22a of the optical interrogator apparatus 22. The system controller 34 then repeatedly determines, for each gauge arm 28, a value for the outward extension of the gauge arm 28 from the body member 26 based on the corrected strain value corresponding to the gauge arm 28 and knowledge of the configuration of the gauge apparatus 20 as the gauge apparatus 20 is passed along the wellbore 4 so as to effectively provide a real-time measurement of the geometry of the wellbore 4.

Figure 5:
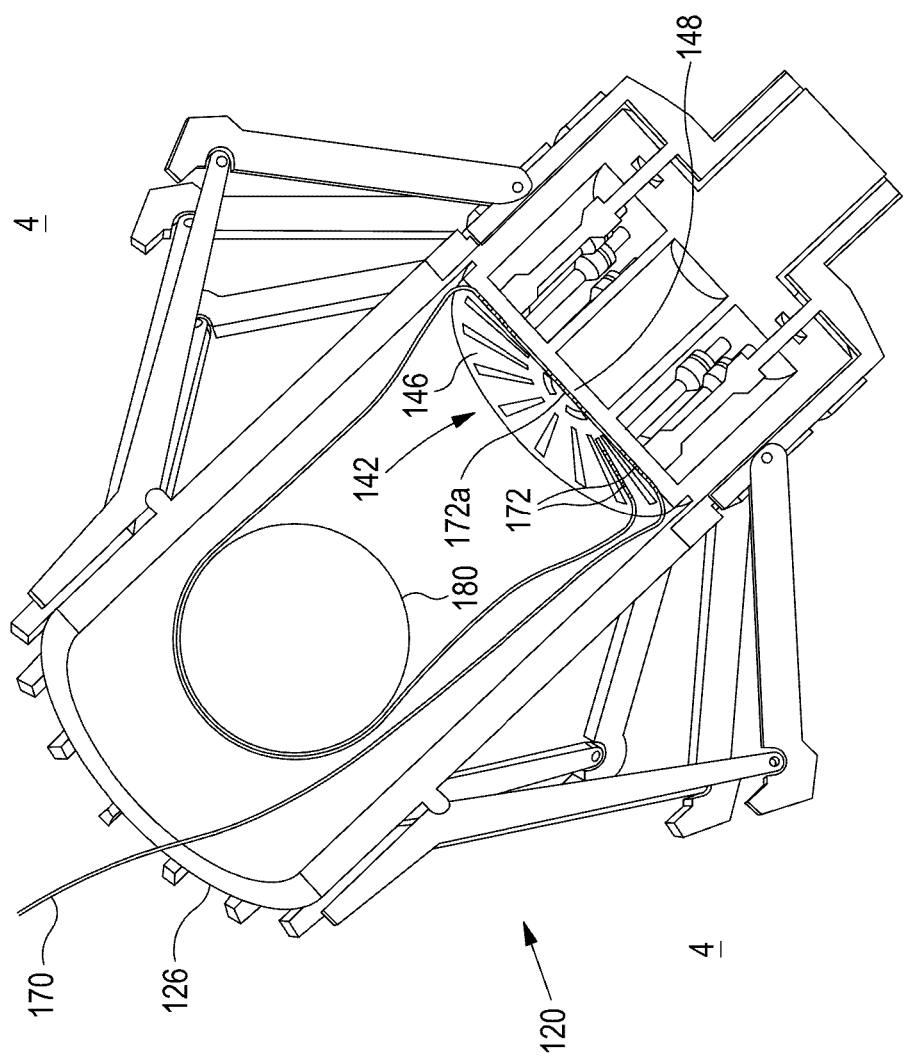
FIG. 5 is a longitudinal cross-section of a first alternative gauge apparatus for use with the gauge system of FIG. 1.

One of ordinary skill in the art will understand that the number and/or arrangement of the sensor optical fibers may be different to that shown in FIG. 4. For example, FIG. 5 shows a first alternative gauge apparatus 120 for use in the system 2 of FIG. 1 in place of the gauge apparatus 20. The gauge apparatus 120 and the gauge apparatus 20 have many like features with like features of the gauge apparatus 120 being identified with the same reference numeral as the corresponding like features of the gauge apparatus 20 incremented by "100". Unlike the gauge apparatus 20, the gauge apparatus 120 has a single optical fiber 170 which defines a plurality of FBG sensor portions 172, each FBG sensor portion 172 attached to a different deformable region 146 of a deformable plate member 142 of the gauge apparatus 120. The optical fiber 170 further defines an FBG sensor portion 172a attached to a central reference region 148 of the deformable plate member 142. The gauge apparatus 120 further includes an optical fiber management arrangement in the form of a reel 180 attached to the body member 126. The optical fiber 170 is wrapped around the reel 180 to facilitate attachment of the optical fiber 170 to the deformable plate member 142 as described above.

One of ordinary skill in the art will understand that the optical interrogator apparatus 22 may be configured to repeatedly transmit light along the optical fiber 170, to repeatedly detect light returning from each of the FBG sensor portions 172, 172a, to distinguish between light returning from each of the different FBG sensor portions 172, 172a, and to determine the strain in each of the different FBG sensor portions 172, 172a based at least in part on one or more properties of the detected returning light as the gauge apparatus 120 is passed along the wellbore 4. For example, each FBG sensor portion 172, 172a may define a different peak reflectance wavelength. The light transmitted along the optical fiber 170 may include a range of wavelengths including the peak reflectance wavelengths of the different FBG sensor portions 172, 172a. The controller 22a of the optical interrogator apparatus 22 may repeatedly determine, a value of the strain induced in the regions 146, 148 of the deformable plate member 142 based at least in part on the peak reflectance wavelength of the detected light returning from the relevant FBG sensor portion 172, 172a as the gauge apparatus 120 is passed along the wellbore 4. In all other respects, the operation of the gauge apparatus 120 is identical to the operation of the gauge apparatus 20 described above.

Figure 6B:
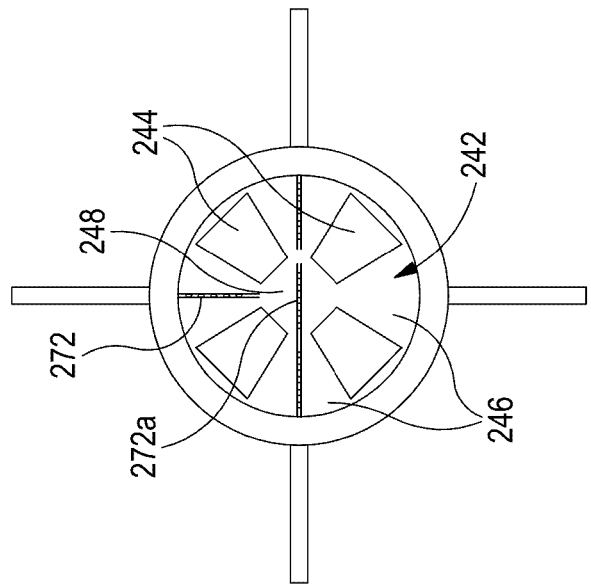
FIG. 6B is a plan view of the second alternative gauge apparatus of FIG. 6A.
Figure 6A:
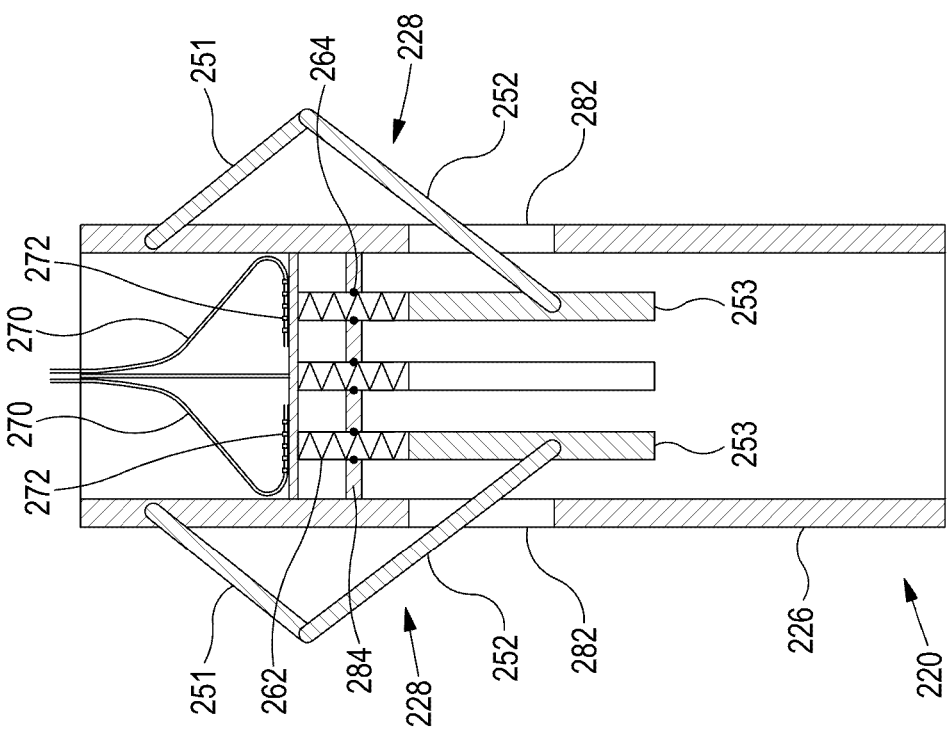
FIG. 6A is a longitudinal cross-section of a second alternative gauge apparatus for use with the gauge system of FIG. 1.

Referring now to FIGS. 6A and 6B, there is shown a second alternative gauge apparatus 220 for use in the system 2 of FIG. 1 in place of the gauge apparatus 20. The gauge apparatus 220 and the gauge apparatus 20 have many like features with like features of the gauge apparatus 220 being identified with the same reference numeral as the corresponding like features of the gauge apparatus 20 incremented by "200". The gauge apparatus 220 includes a body member 226 and a plurality of gauge arms 228. The gauge apparatus 220 includes a deformable plate member 242 located internally of the body member 226. As shown in FIG. 6B, the deformable plate member 242 defines a plurality of apertures 244 extending therethrough. Each pair of adjacent apertures 244 defines a deformable region 246 therebetween. The deformable plate member 242 also defines a central reference region 248.

The body member 226 further defines longitudinally extending slots 282 extending through a wall thereof.

Each gauge arm 228 is articulated. Specifically, each gauge arm 228 includes a first arm member 251, a second arm member 252, and a third arm member 253. The first arm member 251 of each articulated gauge arm 228 is located externally of the body member 226. The second arm member 251 of each articulated gauge arm 228 extends through a corresponding slot 282 through the wall of the body member 226. The third arm member 253 of each articulated gauge arm 228 is located internally of the body member 226. The first arm member 251 is pivotally attached to the body member 226. The first and second are members 251, 252 are pivotally attached to one another. The second and third arm members 252, 253 are also pivotally attached to one another.

The gauge apparatus 220 further includes a plurality of bias members in the form of a plurality of pull rods 262. One end of each pull rod 262 is attached to a corresponding third arm member 253 and the other end of each pull rod 262 is attached to a corresponding deformable region 246 of the deformable plate member 242.

None of the pull rods 262 are attached to the central reference region 248 of the deformable plate member 242. As such, one of ordinary skill in the art will understand that the central reference region 248 of the deformable plate member 242 is susceptible to a strain which is dependent on temperature but which is independent of a degree of outward extension of any of the one or more gauge arms 228 from the body member 226.

The gauge apparatus 220 further includes a plurality of O-ring seal members 264, each O-ring seal member 264 providing a seal between an outer surface of a corresponding pull rod 262 and a plate portion 284 of the body member 226.

The gauge apparatus 220 further includes one or more optical fibers 270 defining FBG sensor portions 272, 272a. Each FBG sensor portion 272 is attached to a corresponding deformable region 246 of the deformable plate member 242. FBG sensor portion 272a is attached to the central reference region 248 of the deformable plate member 242.

In use, each pull rod 262 biases a corresponding gauge arm 228 towards a radially extended configuration. A radially inward force on the gauge arm 228 extends the corresponding pull rod 262 so as to induce a variation in strain in the corresponding deformable region 246 of the deformable plate member 242 which is transferred to the corresponding FBG sensor portion 272. In all other respects, the operation of the gauge apparatus 220 is identical to the operation of the gauge apparatus 20 described above.

Figure 7B:
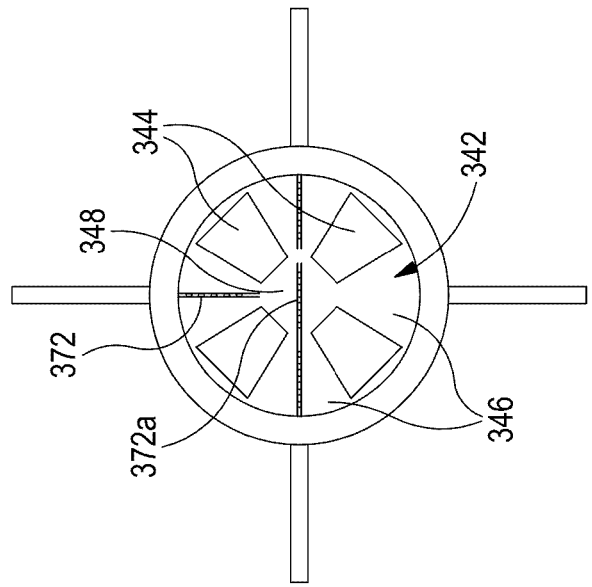
FIG. 7B is a plan view of the third alternative gauge apparatus of FIG. 7A.
Figure 7A:
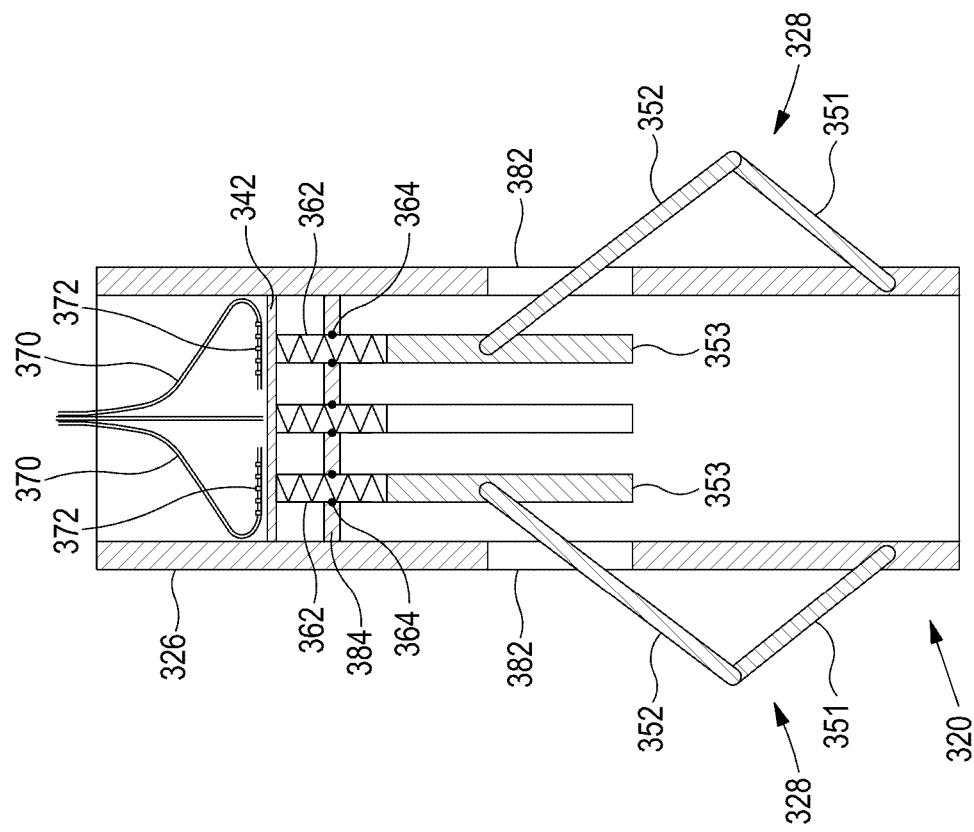
FIG. 7A is a longitudinal cross-section of a third alternative gauge apparatus for use with the gauge system of FIG. 1.

Referring now to FIGS. 7A and 7B, there is shown a third alternative gauge apparatus 320 for use in the system 2 of FIG. 1 in place of the gauge apparatus 20. The gauge apparatus 320 and the gauge apparatus 20 have many like features with like features of the gauge apparatus 320 being identified with the same reference numeral as the corresponding like features of the gauge apparatus 20 incremented by "300". The gauge apparatus 320 includes a body member 326 and a plurality of gauge arms 328. The gauge apparatus 320 includes a deformable plate member 342 located internally of the body member 326. As shown in FIG. 7B, the deformable plate member 342 defines a plurality of apertures 344 extending therethrough. Each pair of adjacent apertures 344 defines a deformable region 346 therebetween. The deformable plate member 342 also defines a central reference region 348. The body member 326 further defines longitudinally extending slots 382 extending through a wall thereof.

Each gauge arm 328 is articulated. Specifically, each gauge arm 328 includes a first arm member 351, a second arm member 352, and a third arm member 353. The first arm member 351 of each gauge arm 328 is located externally of the body member 326. The second arm member 351 of each gauge arm 328 extends through a corresponding slot 382 through the wall of the body member 326. The third arm member 353 of each gauge arm 328 is located internally of the body member 326. The first arm member 351 is pivotally attached to the body member 326. The first and second arm members 351, 352 are pivotally attached to one another. The second and third arm members 352, 353 are also pivotally attached to one another.

The gauge apparatus 320 further includes a plurality of bias members in the form of a plurality of push rods 362. One end of each push rod 362 is attached to a corresponding third arm member 353 and the other end of each push rod 362 is attached to a corresponding deformable region 346 of the deformable plate member 342.

None of the push rods 362 are attached to the central reference region 348 of the deformable plate member 342. As such, one of ordinary skill in the art will understand that the central reference region 348 of the deformable plate member 342 is susceptible to a strain which is dependent on temperature but which is independent of a degree of outward extension of any of the one or more gauge arms 328 from the body member 326.

The gauge apparatus 320 further includes a plurality of O-ring seal members 364, each O-ring seal member 364 providing a seal between an outer surface of a corresponding push rod 362 and a plate portion 284 of the body member 226.

The gauge apparatus 320 further includes one or more optical fibers 370 defining FBG sensor portions 372, 372a.

Each FBG sensor portion 372 is attached to a corresponding deformable region 346 of the deformable plate member 342. FBG sensor portion 372a is attached to the central reference region 348 of the deformable plate member 342.

In use, each push rod 362 biases a corresponding gauge arm 328 towards a radially extended configuration. A radially inward force on the articulated gauge arm 328 compresses the corresponding push rod 362 so as to induce a variation in strain in the corresponding deformable region 346 of the deformable plate member 342 which is transferred to the corresponding FBG sensor portion 372. In all other respects, the operation of the gauge apparatus 320 is identical to the operation of the gauge apparatus 20 described above.

It will be appreciated by one of ordinary skill in the art that various modifications may be made to the foregoing systems and methods without departing from the scope of the present invention as defined by the claims. For example, the optical interrogator apparatus may be configured to detect a portion of the light input to each optical fiber and the optical apparatus controller may be configured to determine, for each of the one or more regions of the deformable plate member, the value of the strain in the region of the deformable plate member based in part on one or more properties of the detected portion of the light input to each optical fiber.

The deformable plate member may form part of, or be integral or unitary with the body member.

Rather than using an optical fiber defining one or more FBG sensor portions and monitoring the peak reflectance wavelength corresponding to each FBG sensor portion, one of ordinary skill in the art will understand that the gauge system may be configured to measure the strain induced in the optical fiber using other techniques. For example, the gauge system may include an optical fiber which does not define any FBG sensor portions but which may instead be configured to perform distributed measurements of inelastic backscattering such as Brillouin backscattering at different positions along the optical fiber and to convert the measured inelastic backscattering into a strain profile along the optical fiber. Specifically, the optical interrogator apparatus may be configured to transmit optical pulses along the optical fiber, to detect optical pulses returning along the optical fiber, and to monitor a spectrum of the detected optical pulses returning from different positions along the optical fiber based on the different times of arrival of the returning optical pulses at the optical interrogator apparatus. The optical interrogator apparatus may be configured to measure a wavelength of a spectral peak associated with Brillouin backscattering along the optical fiber. The optical interrogator apparatus may be configured to measure a wavelength of a spectral peak associated with Rayleigh backscattering along the optical fiber. The optical interrogator apparatus may be configured to determine the strain profile along the optical fiber based on the difference in wavelength or frequency between the spectral peak associated with the Brillouin backscattering and the spectral peak associated with the Rayleigh backscattering along the optical fiber.

The functionality of the controller 22a of the optical interrogator apparatus and the functionality of the system controller 34 may be performed by a single controller.

The invention claimed is:

1. A gauge apparatus for use in making real-time measurements of a geometry of an elongated space, the gauge apparatus comprising:
  a body member having a sealed internal cavity;
  one or more gauge arms biased outwardly from the body member for engagement with a wall of the elongated space, wherein each gauge arm includes a first segment, a second segment, and a third segment, wherein each first segment is pivotally attached to the body member, each respective second segment is pivotally attached to a respective first segment and to a respective third segment; and a deformable plate member that includes one or more deformable regions, the deformable plate disposed within the internal cavity; and one or more bias members, wherein each bias member is in communication with a respective gauge arm third segment and in communication with a respective deformable region;

wherein the gauge apparatus is configured so that a variation in an outward extension of each gauge arm from the body member induces a change in strain in a corresponding one of the one or more deformable regions; and wherein the gauge apparatus is configured for attachment of an optical fiber to the gauge apparatus so that a strain in each deformable region of the gauge apparatus is transferred to a corresponding sensor portion of the optical fiber.

2. The gauge apparatus as claimed in claim 1, wherein each of the one or more deformable regions is elastically deformable.

3. The gauge apparatus as claimed in claim 1, wherein each gauge arm is located outside the body member, or wherein each gauge arm extends through a wall of the body member.

4. The gauge apparatus as claimed in claim 1, wherein each bias member is configured to bias a corresponding one of the gauge arms in an outward direction relative to the body member.

5. The gauge apparatus as claimed in claim 4, wherein each bias member biases the corresponding gauge arm in an outward direction relative to the body member such that a force acting on the corresponding gauge arm in an inward direction relative to the body member acts against the corresponding bias member and the corresponding bias member induces a corresponding change in strain in the corresponding deformable region of the gauge apparatus.

6. A gauge system for use in making real-time measurements of a geometry of an elongated space, the gauge system comprising:

the gauge apparatus as claimed in claim 1; and
an optical fiber attached to the gauge apparatus so that a strain in each deformable region of the gauge apparatus is transferred to a corresponding sensor portion of the optical fiber.

7. The gauge system as claimed in claim 6, wherein the optical fiber is attached to the gauge apparatus using a polymer based adhesive and/or an epoxy or wherein the optical fiber is metallized and the optical fiber is attached to the gauge apparatus using metal-to-metal based bonding and/or by brazing.

8. The gauge system as claimed in claim 6, comprising:
an optical apparatus configured to transmit light along the optical fiber to each sensor portion of the optical fiber and to detect light returning from each sensor portion of the optical fiber; and
a controller,
wherein the controller is configured to determine a value of a strain in each sensor portion of the optical fiber based at least in part on one or more properties of the detected returning light.

9. The gauge system as claimed in claim 8, wherein the optical apparatus is configured to detect a portion of the light input to the optical fiber, and wherein the controller is configured to determine the value of the strain in each sensor portion of the optical fiber based in part on one or more properties of the detected portion of the light input to the optical fiber.

10. The gauge system as claimed in claim 8, wherein the controller is configured to determine, for each gauge arm, a value for the outward extension of the gauge arm from the body member based on the determined strain value in the sensor portion of the optical fiber corresponding to the gauge arm and knowledge of the configuration of the gauge apparatus.

11. The gauge system as claimed in claim 8, wherein the optical fiber is attached to the gauge apparatus so that a strain in a reference region of the gauge apparatus is transferred to a corresponding reference portion of the optical fiber, wherein the reference region of the gauge apparatus is susceptible to a strain which is dependent on temperature but independent of a degree of outward extension of any of the one or more gauge arms from the body member, wherein the optical apparatus is configured to transmit light along the optical fiber to the reference portion of the optical fiber and to detect light returning from the reference portion of the optical fiber, and wherein the controller is configured to determine a value of a strain in the reference portion of the optical fiber based at least in part on one or more properties of the detected light returning from the reference portion of the optical fiber and to correct the determined value of the strain in each sensor portion of the optical fiber for temperature based at least in part on the determined value of the strain in the reference portion of the optical fiber.

12. The gauge system as claimed in claim 8, comprising a plurality of optical fibers, wherein each optical fiber is attached to the gauge apparatus and wherein a variation in the outward extension of each gauge arm from the body member induces a change in strain in a corresponding sensor portion of one of the optical fibers.

13. The gauge system as claimed in claim 12, wherein the optical apparatus is configured to transmit light along each optical fiber to the sensor portion of each optical fiber and to detect light returning from the sensor portion of each optical fiber, and wherein the controller is configured to determine a value of a strain in the sensor portion of each optical fiber based at least in part on one or more properties of the detected light returning from the sensor portion of each optical fiber.

14. The gauge system as claimed in claim 12, wherein the optical apparatus is configured to detect a portion of the light input to each optical fiber and the controller is configured to determine the value of the strain in the sensor portion of each optical fiber based in part on one or more properties of the detected portion of the light input to each optical fiber.

15. The gauge system as claimed in claim 12, wherein one or more of the optical fibers is attached to the gauge apparatus so that a strain in a reference region of the gauge apparatus is transferred to one or more corresponding reference portions of one or more of the optical fibers, wherein the reference region of the gauge apparatus is susceptible to a strain which is dependent on temperature but independent of a degree of outward extension of any of the one or more gauge arms from the body member, wherein the optical apparatus is configured to transmit light along one or more of the optical fibers to the one or more corresponding reference portions of the one or more optical fibers and to detect light returning from the one or more corresponding reference portions of the one or more optical fibers, and wherein the controller is configured to determine a value of a strain in each of the one or more reference portions of the one or more optical fibers based at least in part on one or more properties of the detected light returning from each of the one or more reference portions of the one or more optical fibers and to correct the determined value of the strain in each sensor portion of the optical fiber for temperature based at least in part on the one or more determined values of the strain in the one or more reference portions of the one or more optical fibers.

16. A method for use in making real-time measurements of a geometry of an elongated space, the method comprising:
   providing a gauge apparatus that includes a body member having a sealed internal cavity, one or more gauge arms biased outwardly from the body member, a deformable plate member disposed within the internal cavity, and one or more bias members, wherein each gauge arm includes a first segment, a second segment, and a third segment, and wherein each first segment is pivotally attached to the body member, each respective second segment is pivotally attached to a respective first segment and to a respective third segment, and wherein the deformable plate member includes one or more deformable regions, and wherein each bias member is in communication with a respective gauge arm third segment and in communication with a respective deformable region;
   passing the gauge apparatus along the elongated space with the one or more gauge arms of the gauge apparatus biased outwardly into engagement with a wall of the elongated space so that any variation in a transverse geometry of the elongated space causes a variation in an outward extension of each gauge arm from the body member of the gauge apparatus;
   wherein the gauge apparatus is configured so that the variation in the outward extension of each gauge arm from the body member induces a change in strain in a corresponding deformable region and wherein an optical fiber is attached to the gauge apparatus so that a strain in each deformable region is transferred to a corresponding sensor portion of the optical fiber.

17. The method as claimed in claim 16, comprising:
   transmitting light along the optical fiber to each sensor portion of the optical fiber;
   detecting light returning from each sensor portion of the optical fiber; and
   determining a value of a strain in each sensor portion of the optical fiber based at least in part on one or more properties of the detected returning light.

18. The method as claimed in claim 17, comprising:
   detecting a portion of the light input to the optical fiber; and
   determining the value of the strain in each sensor portion of the optical fiber based in part on one or more properties of the detected portion of the light input to the optical fiber.

19. The method as claimed in claim 17, comprising determining, for each gauge arm, a value for the outward extension of the gauge arm from the body member based on the determined strain value in the sensor portion of the optical fiber corresponding to the gauge arm and knowledge of the configuration of the gauge apparatus.

* * * * *